(12) United States Patent
Narayanan et al.

(10) Patent No.: US 9,961,729 B1
(45) Date of Patent: May 1, 2018

(54) TRIMMING SYSTEM AND METHOD FOR REGULATED CURRENT MIRRORS

(71) Applicant: Dialog Semiconductor (UK) Limited, London (GB)

(72) Inventors: Shyam Narayanan, Germering (DE); Fulvio Schiappelli, Pullach im Isartal (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days. days.

(21) Appl. No.: 15/797,185

(22) Filed: Oct. 30, 2017

(30) Foreign Application Priority Data

Mar. 21, 2017 (DE) .......................... 10 2017 204 718

(51) Int. Cl.
*H05B 33/08* (2006.01)

(52) U.S. Cl.
CPC ..... *H05B 33/0815* (2013.01); *H05B 33/0857* (2013.01)

(58) Field of Classification Search
CPC ............ H05B 33/0815; H05B 33/0812; H05B 33/0842; H05B 33/0851; H05B 33/0845; H02M 3/156; H02M 3/33507; H02M 2001/0025; G05F 3/30; G05F 1/625; Y02B 20/347
See application file for complete search history.

(56) References Cited

U.S. PATENT DOCUMENTS 5,481,178 A * 1/1996 Wilcox ................. H02M 3/156
323/224
6,472,856 B2 * 10/2002 Groom .................. H02M 3/156
323/284

(Continued)

FOREIGN PATENT DOCUMENTS

DE 10 2014 219 840 3/2016
EP 0 523 266 1/1993

OTHER PUBLICATIONS

German Office Action, File No. 10 2017 204 718.6, Applicant: Dialog Semiconductor (UK) Ltd., dated Aug. 9, 2017, 9 pgs. and English language translation, 9 pgs.

*Primary Examiner* — Haissa Philogene
(74) *Attorney, Agent, or Firm* — Saile Ackerman LLC; Stephen B. Ackerman (57) ABSTRACT

A system for trimming a load current provided to a load terminal has a reference current circuit branch and a load current circuit branch. The reference current circuit branch has a current source, a first variable resistance element and a first decoupling resistance element connected between the current source and the first variable resistance element. The load current circuit branch has the load terminal, a second variable resistance element configured to attain a resistance value depending on a resistance value attained by the first variable resistance element, and a second decoupling resistance element connected between the load terminal and the second variable resistance element. In addition, the trim- (Continued)

ming system has voltage and current regulators. The current regulator regulates the load current based on a voltage difference between a first output terminal of the first decoupling resistance element and a second output terminal of the second decoupling resistance element.

27 Claims, 7 Drawing Sheets

(56) References Cited

U.S. PATENT DOCUMENTS

| | | | | |
|---|---|---|---|---|
| 6,894,473 | B1* | 5/2005 | Le | G05F 3/30 |
| | | | | 323/314 |
| 8,400,126 | B2* | 3/2013 | Iacob | G05F 1/56 |
| | | | | 323/282 |
| 9,392,661 | B2* | 7/2016 | Schiappelli | H05B 33/0815 |
| 9,703,306 | B2* | 7/2017 | Day | G05F 1/625 |
| 2007/0205823 | A1 | 9/2007 | Cho | |

* cited by examiner

TRIMMING SYSTEM AND METHOD FOR REGULATED CURRENT MIRRORS

TECHNICAL FIELD

The present document relates to a system and method of trimming a load current provided to a load terminal. In particular, the present document relates to a system and method for trimming regulated current mirrors which provide load currents to a plurality of light emitting diode LED circuits.

BACKGROUND

Light-emitting diodes (LED) are semiconductor light sources traditionally used as indicator lamps in many devices. In addition, LEDs are being increasingly used also for lighting, where one particular use is for providing backlighting. For example, LED backlighting is being increasingly used for liquid crystal displays (LCDs), as LCDs do not produce their own illumination. Furthermore, LED backlight lighting systems are becoming increasingly common for the use in display backlighting and keypad backlighting in portable devices such as cell phones, smartphones, PDAs, digital cameras, personal navigation devices and other portable devices with keypads and/or LCD displays.

LED lighting systems are generally associated with a variety of advantages over traditional lighting sources such as incandescent lighting. For example, LEDs are efficient, associated with longer life, exhibit faster switching and produce less heat than traditional lighting sources. Due to the faster switching characteristics of LEDs, they are suitable for use in fast and highly responsive circuits by allowing for both quick response/start-up time and the capability to be operated at high frequency, further allowing for such enhancements as frequency modulation in order to reduce power consumption.

LED lighting systems typically comprise "strings" of stacked LEDs (also referred to as LED strings or LED circuits in the following) in which multiple LEDs are connected in series. An LED driver control circuit provides a regulated high supply voltage to the LED strings of stacked LEDs. A common practice to control the current that flows in each of the LED strings is to pull a well-defined current from the cathode side of each LED string, via programmable current sources or programmable current sinks. In order to protect the system components from excessive voltage levels and avoid excessive high current to flow in the LED circuit, an overvoltage protection mechanism is generally provided to disable the delivery of power to the circuit in the event that the voltage rises above a certain threshold.

Figure 1:
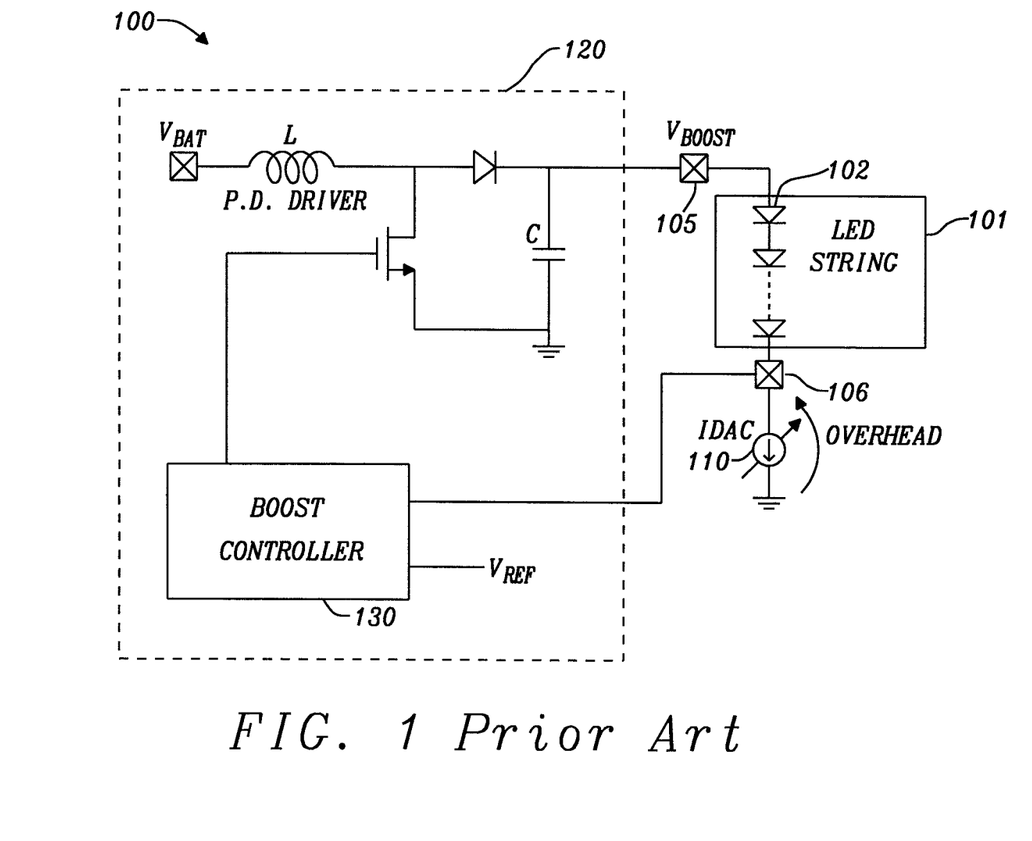
FIG. 1 shows a circuit diagram of a conventional LED lighting system for a plurality of LED strings with a feedback mechanism for controlling the drive voltage.

FIG. 1 schematically illustrates a conventional LED lighting system 100. This LED lighting system 100 comprises a plurality of LED strings 101 (of which only one is shown in FIG. 1 for illustrative purposes), each LED string 101 comprising a plurality of LEDs 102. Typically, a LED string 101 may comprise up to six or more LEDs 102, and the LED lighting system 100 may comprise up to 12 or more LED strings 101. An IDAC (current digital-to-analog converter) current generator 110, which is an example of a programmable current sink, is provided for each LED string 101 at the cathode side of the respective LED string 101. The IDAC current generators 110 allow sinking/pulling a well-defined current from each LED string 101 to ground. The LED lighting system 100 illustrated in FIG. 1 further comprises a boost regulator circuit 120 (power source) that comprises a boost controller 130 and is adapted to provide a regulated boost voltage (supply voltage, drive voltage) to each of the LED strings 101, or in more detail, to a boost voltage node 105 at the anode side of each LED string 101. A feedback voltage from a feedback node 106 at the cathode side of each LED string 101 is provided to the boost regulator circuit 120. The boost regulator circuit 120 is adapted to boost a battery voltage to a supply voltage that is higher than the battery voltage and to regulate the voltage at the feedback node 106 at the cathode side of each LED string by performing feedback control in accordance with the feedback voltages received from the LED strings 101.

In the LED lighting system 100 illustrated in FIG. 1, each LED string's 101 current ILED is programmed by a respective IDAC current generator 110. The voltage drop (overhead) across each IDAC current generator 110 (i.e. the voltage drop between the feedback node 106 and ground) times the respective current, multiplied by the number of LED strings 101, results in a dissipation of power which should be minimized in order to increase the overall boost efficiency.

In more detail, the total dissipated power resulting from the overhead consumption is given by $$P_{diss} = V_{LED} \cdot I_{LED} \cdot N_{str},$$

where VLED is the voltage at the feedback node 106, ILED is the current flowing through each LED circuit 101, and Nstr is the number of LED circuits 101. Here, and in the following, unless not indicated otherwise, all voltages are understood to be given with reference to ground. Thus, in order to increase the efficiency of the boost regulator circuit 120, the overhead needs to be reduced.

Prior art lighting systems employ a plurality of current mirrors, one or more for each LED string 101, for sourcing the well-defined current to each LED string 101. Each current mirror is configured to mirror a respective reference current to the cathode side of the respective LED string 101. Conventionally, cascoded current generators that work in saturation are used for forming the current mirrors.

These lighting systems have the drawback that a high voltage drop over the current generators occurs, i.e. that a high overhead is present, at the cost of system efficiency. In addition, conventional lighting systems have poor scalability as regards quiescent current consumption and also as regards area of circuitry. A further drawback of conventional lighting systems is that properties (such as e.g. threshold voltages and/or resistances) of the transistors used in the current mirrors may deviate from expected properties due to imperfect manufacturing processes, during which e.g. doping mismatches occur. As a result, the values of the currents flowing through each LED circuit may deviate from expected values, further degrading the overall performance of the lighting system.

SUMMARY

There is a need for means and a method for controlling currents in a plurality of LED strings of a LED lighting system that result in low overhead and high accuracy. The present document addresses the above mentioned technical problems. In particular, the present document addresses the technical problem of accurately controlling load currents provided to a plurality of LED strings. According to an aspect, a trimming system for trimming a load current provided to a load terminal is presented. The trimming system comprises a reference current circuit branch, a load current circuit branch, a voltage regulator and a current regulator. On the one hand, the reference current circuit branch comprises a current source configured to generate a reference current, a first variable resistance element, and a first decoupling resistance element connected between the current source and the first variable resistance element. On the other hand, the load current circuit branch comprises the load terminal and a second variable resistance element configured to attain a resistance value depending on (e.g. proportional to) a resistance value attained by the first variable resistance element. In addition, the load current circuit branch comprises a second decoupling resistance element connected between the load terminal and the second variable resistance element. The voltage regulator is configured to regulate a second voltage at a node between the load terminal and the second decoupling resistance element depending on a first voltage at a node between the current source and the first decoupling resistance element. The current regulator is configured to regulate the load current provided to the load terminal based on a voltage difference between a first output terminal of the first decoupling resistance element and a second output terminal of the second decoupling resistance element.

In this document, a current source is regarded as an electronic circuit that delivers or absorbs an electric current. In an ideal scenario, the delivered or absorbed electric current is independent of a voltage across the current source.

On the one hand, the first variable resistance element may be for example a diode-connected MOS transistor operating either in saturation or in the triode region. On the other hand, the second variable resistance element may be for example a proportional mirror transistor operating in the same region as the diode-connected MOS transistor. In other words, the proportional mirror transistor may be configured to mirror the reference current. In doing so, the mirror transistor may operate in saturation when the diode-connected MOS transistor operates in saturation, and the mirror transistor may operate in the triode region when the diode-connected MOS transistor operates in the diode region.

For example, in each circuit branch, the mentioned units may be arranged in series. In the reference current circuit branch, the reference current provided by the current source may flow through the first decoupling resistance element and the first variable resistance element to a common reference potential of the trimming system, which may be e.g. ground. In the load current circuit branch, a power source may be provided which is configured to generate a drive voltage to a load. Driven by said drive voltage, a load current may flow from the load connected to the load terminal through the second decoupling resistance element and the second variable resistance element to said common reference potential. The load may be external to the described trimming system. Alternatively, the trimming system may comprise the load, which may be e.g. a light emitting diode LED circuit connected to the load terminal.

In general, the trimming system may comprise a plurality of load current branches for providing respective load currents to a plurality of LED circuits. At this, it is desirable that the values of the load currents provided to the LED circuits may be precisely controlled by adjusting the reference current of the current source. Using e.g. an IDAC (current digital-to-analog converter) current generator as current source, the reference current itself may be controlled in a precise and pre-determined manner. For example, the current source may be a programmable current source configured to output an output current in accordance with a digital input code representing a numerical value by performing a switching operation in accordance with the digital input code.

The provision of (a) the voltage regulator for regulating the second voltage within the load current circuit branch in dependency of a first voltage within the reference current circuit branch in combination with (b) a pair of correlated variable resistance elements (namely the first and the second variable resistance elements) enables controlling a current ratio between the reference current and the load current. For instance, the voltage regulator may be configured to regulate the second voltage to a voltage level which is substantially equal to a voltage level of the first voltage. The current ratio between the reference current and the load current may then be determined based on a resistance ratio between the resistance value attained by the first variable resistance element and the resistance value attained by the second variable resistance element. At this, the second variable resistance element may be configured such that the resistance ratio between the resistance value of the first variable resistance element and the resistance value of the second variable resistance element corresponds to a ratio among a set of predetermined ratios, such as e.g. 1:½ or 1:½₀.

However, due to unavoidable inaccuracy of the resistance values of the first and the second variable resistance elements (caused e.g. by an imperfect manufacturing process), the resistance ratio may deviate from a pre-determined resistance ratio. As a consequence, the load current provided to the load terminal may deviate from a pre-determined load current.

The current regulator is configured to address the above described problem by regulating the load current based on a voltage difference between a first output terminal of the first decoupling resistance element and a second output terminal of the second decoupling resistance element. At this, the first output terminal may be located on the reference current circuit branch between the first decoupling resistance element and the first variable resistance element. Analogously, the second output terminal may be located on the load current circuit branch between the second decoupling resistance element and the second variable resistance element. That is, the first and the second decoupling resistance elements make it possible to decouple (a) the nodes at the first voltage and the second voltage from (b) the first and the second variable resistance element, respectively. In other words, the node at the second voltage between the load terminal and the second decoupling element is decoupled from the second variable resistance element. Thus, a voltage at the second output terminal may be directly influenced by the resistance value of the second variable resistance element. The described configuration comprising the two decoupling resistive elements and the current regulator enables detection of a load current mismatch as well as automatic calibration of the load current on the basis of a comparison of the two voltages at the first output terminal and the second output terminal.

Put in a different way, the proposed trimming system enables trimming the load current automatically and dynamically during an operational phase of the entire system. In systems known from the state of the art, a trimming procedure has to be executed in advance in a pre-operational testing phase. During this pre-operational testing phase, the load currents at the individual load terminals have to be measured directly and adapted individually using external references. For large backlight displays requiring a large number of LED strings, this testing phase may take considerable time, e.g. up to a few seconds. By moving the trimming procedure into the chip, the testing phase may be shortened drastically and may be executed in an online fashion to adapt the load currents e.g. to a changed temperature and changed operating conditions. Moreover, the proposed trimming system enables a high accuracy for adjusting the load currents to desired values. This high accuracy is achieved for all values of the reference current provided by the current source. For a programmable IDAC (see FIG. 4), the load currents may be trimmed across the complete range of the input code and not only for certain values (e.g. 1282 and 1283, see FIG. 4) of the input code. This means that for every input code, the load currents are calibrated on the fly by the presented trimming system and the required accuracy is met.

In particular, the current regulator may be configured to reduce said voltage difference between the first output terminal and the second output terminal. As will be described in more detail below, the current regulator may comprise a comparator unit or an error amplifier for detecting and measuring the voltage difference. In a special case, the current regulator may be configured to minimize the voltage difference e.g. to a value close to zero. In doing so, the current regulator may be configured to regulate, based on said voltage difference, the load current by enabling or disabling current branches within the load current circuit branch, wherein said current branches are arranged in parallel to the second variable resistance element. For instance, the trimming system may comprise a single additional current branch comprising a third variable resistance element. The current regulator may be configured to disable the additional current branch in parallel to the second variable resistance element in case the voltage difference indicates that a voltage at the first output terminal is larger than a voltage at the second output terminal. The other way round, the current regulator may be configured to enable the additional current branch in parallel to the second variable resistance element in case the voltage difference indicates that a voltage at the first output terminal is lower than a voltage at the second output terminal. Of course, the trimming system may also comprise a plurality of additional current branches for enabling fine tuning of the overall resistance value of the load current circuit branch. In addition, the current controller may comprise a branch selection unit and at least one switching unit per current branch, and the branch selection unit may be configured to determine which current branches are enabled/disabled by the switching units.

Thus, in general, it may be said the current regulator is configured to reduce (or increase) a difference between an overall resistance value of the load current circuit branch and an overall resistance value of the reference current circuit branch based on the voltage difference between the first output terminal and the second output terminal, such that the resistance ratio is brought back to the expected value for a given load current. This may be achieved by adding and/or removing additional current branches comprising variable resistance elements connected in parallel to the second variable resistance element such that the resistance of the added/removed variable resistance elements compensates the difference between an actual resistance ratio (between the resistance value attained by the first variable resistance element and the resistance value attained by the second variable resistance element) and a given, pre-determined resistance ratio (between a resistance value the first variable resistance element is supposed to attain and a resistance value the second variable resistance element is supposed to attain).

Further, the first decoupling resistance element may comprise a first transistor and the second decoupling resistance element may comprise a second transistor. A gate of the first transistor and a gate of the second transistor may be biased at the same voltage level. For example, both the first transistor and the second transistor may be biased to operate in the triode region. In the reference current circuit branch, a source of the first transistor may be connected with the first output terminal such that the voltage at the first output terminal is applied to the source of the first transistor. A drain of the first transistor may be connected with the node between the current source and the first decoupling resistance element such that the first voltage is applied to the drain of the first transistor. In the other circuit branch, a source of the second transistor may be connected with the second output terminal such that the voltage at the second output terminal is applied to the source of the second transistor. Further, a drain of the second transistor may be connected with the node between the load terminal and the second decoupling resistance element such that the second voltage is applied to the drain of the second transistor.

At this, it should be mentioned that the first and the second decoupling resistance elements may serve a different purpose in addition to decoupling the nodes at the first and the (regulated) second voltage from the first and the second variable resistance elements, respectively. For example, the first and the second decoupling resistance elements may be operated as switches to switch on and off the respective load currents for the different load terminals. Moreover, the first and the second decoupling resistance elements may be operated to apply pulse-width modulation (PWM) control to potential LED circuits which may be connected to the respective load terminals.

The first variable resistance element may comprise a third transistor and the second variable resistance element may comprise a fourth transistor, and both the third transistor and the fourth transistor may be biased to operate in the triode region. Alternatively, the third transistor and the fourth transistor may be biased to operate in saturation. A gate terminal of the third transistor may be connected to a gate terminal of the fourth transistor. Both a source of the third transistor and a source of the fourth transistor may be connected to the same reference potential (e.g. ground). In other words, the third transistor may be a diode connected transistor and the fourth transistor may be its mirror transistor. A drain of the third transistor may be connected to the first output terminal and a drain of the fourth transistor may be connected to the second output terminal.

In view of the foregoing, it can be said that the combination of the third transistor and the fourth transistor resembles a current mirror, with the difference that the respective transistors may not be operated in saturation, as is conventionally the case for current mirrors, but in the triode region. Operating the third and fourth transistor in the triode region instead of in saturation allows setting the voltages at the first and output terminals and thus also at the load terminal to lower values, thus improving the overall system efficiency in terms of power consumption. In the configuration described above, varying the current flowing through the third transistor (i.e. the reference current) varies the current flowing through the fourth transistor, and accordingly also the load current.

Further, the gate terminal of the third transistor may be connected to a node between the current source and a drain terminal of the first decoupling resistance element. The voltage at said node between the current source and the drain terminal depends on the current flowing through the first variable resistance element in accordance with a relationship well-known to the skilled person. Therefore, in general, it can be said that the first variable resistance element may be configured to attain its resistance value in dependence on a current output by the current source.

As already mentioned, the current regulator may comprise a trimming circuitry and at least one parallel path between the second output terminal and the reference potential. In case the variable resistance elements are implemented using the third and fourth transistor, a parallel path may comprise a fifth transistor as the third variable resistance element, wherein a gate terminal of the fifth transistor is connected to the gate terminals of the third and the fourth transistor, the source terminal of the fifth transistor is connected to the source terminals of the third and the fourth transistor, and the drain terminal of the fifth transistor is connected to the drain terminals of the third and the fourth transistor. Each parallel path may comprise a switching unit configured to interrupt, based on a control signal received from the trimming circuitry, the parallel path. The trimming circuitry may be configured to reduce the voltage difference by generating the control signal appropriately. The fifth transistor may be biased to operate in the triode region, too. Moreover, the current regulator may further comprise a comparator unit configured to compare a voltage at the first output terminal and a voltage at the second output terminal and to generate a comparator signal, and the trimming circuitry may be configured to generate the control signal based on the comparator signal.

According to another aspect, a method of trimming a load current provided to a load terminal is presented. The method comprises providing—within a reference current circuit branch of a trimming system—a current source for generating a reference current, a first variable resistance element, and a first decoupling resistance element connected between the current source and the first variable resistance element. Moreover, the method comprises providing—within a load current circuit branch of a trimming system—the load terminal, a second variable resistance element, and a second decoupling resistance element connected between the load terminal and the second variable resistance element. The second variable resistance element attains a resistance value depending on a resistance value attained by the first variable resistance element. A second voltage at a node between the load terminal and the second decoupling resistance element is regulated depending on a first voltage at a node between the current source and the first decoupling resistance element. Further, the load current provided to the load terminal is regulated based on a voltage difference between a first output terminal of the first decoupling resistance element and a second output terminal of the second decoupling resistance element.

The load current may be regulated by reducing the voltage difference between the first output terminal and the second output terminal. Specifically, the regulation may comprise enabling or disabling current branches within the load current circuit branch, wherein said current branches are arranged in parallel to the second variable resistance element. For example, the regulation of the load current comprises disabling an additional current branch in parallel to the second variable resistance element in case the voltage difference indicates that a voltage at the first output terminal is larger than a voltage at the second output terminal. Similarly, the regulation of the load current comprises enabling an additional current branch in parallel to the second variable resistance element in case the voltage difference indicates that a voltage at the first output terminal is lower than a voltage at the second output terminal.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 2:
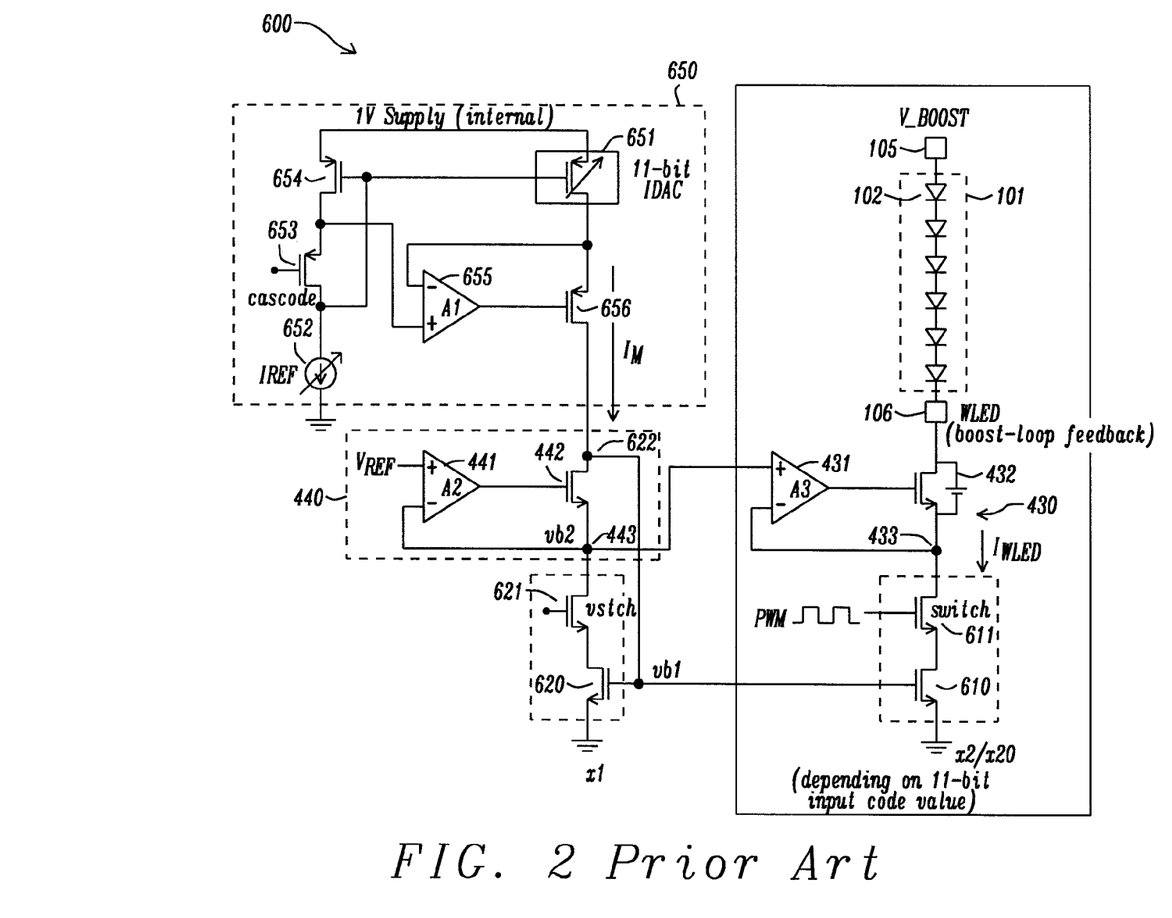
FIG. 2 schematically shows a circuit diagram of an LED lighting system known from the prior art.

FIG. 2 illustrates a regulated cascode current mirror type architecture which is known from patent document U.S. Pat. No. 9,392,661 B2. The trimming system described in the present document may be applied to the systems presented in U.S. Pat. No. 9,392,661 B2, the contents of which are incorporated herein by reference in its entirety. However, it should be mentioned that the concepts described in the present document are not limited to the systems presented in U.S. Pat. No. 9,392,661 B2. Rather, the described trimming method and system may be applied in a straightforward manner to any current mirror architecture of the cascode/regulated cascode type.

FIG. 2 shows a circuit diagram of an exemplary lighting system 600 to which the presented trimming method may be applied. A reference current circuit branch comprises a programmable current source 650 for generating a reference current, an optional voltage regulator 440, a first transistor 621, and a third transistor 620. Both the first transistor 621 and the third transistor 620 may be operated in the triode region. Moreover, the third transistor 620 may serve as first variable resistance element.

The programmable current source 650 comprises an IDAC 651 (a digital-to-analog converter outputting a programmable current which may be built using a cascoded PMOS current mirror topology), a cascoded PMOS diode connected transistor 653, 654, a current generator 652, an operational amplifier 655 (A1), and a transistor element 656 (e.g. a PMOS transistor). The current generator 652 provides a basis reference current IREF. The basis reference current IREF is mirrored to the IDAC 651 through the cascoded PMOS transistors 653, 654. A voltage is supplied to the source side of the IDAC 651 and of the cascoded PMOS transistor 654. A feedback circuit (feedback loop) that may have unit gain and that is formed by the operational amplifier 655, which preferably has high gain, and the transistor element 656, serves to increase the output impedance of the current source 650. It is to be understood that depending on specific requirements, the feedback circuit and/or the cascoded PMOS transistors may be omitted from the current source 650.

As illustrated in FIG. 2, the optional voltage regulator 440 comprises an operational amplifier 441 and a transistor 442 for controlling a first voltage vb2 at a node 443 between the current source 650 and the first transistor 621.

In the illustrated example, the load current circuit branch comprises a LED string 101 comprising a plurality of LEDs 102 which is arranged between a boost voltage node 105 and a load terminal 106. A boost regulator circuit 120 coupled to the boost voltage node 105 is not illustrated in FIG. 2. The load current circuit branch further comprises a voltage regulator, a second transistor 611 and a fourth transistor 610. The second transistor 611 and the fourth transistor 610 may be operated in the triode region, and the fourth transistor 610 may serve as second variable resistance element. The voltage regulator comprises an operational amplifier 431 and a transistor 432 for controlling a second voltage at a node 433 between the load terminal 106 and the second transistor 611 based on the first voltage vb2 at node 443 within the reference current circuit branch. In the depicted example, the voltage regulator forces the second voltage within the load current circuit branch to be substantially equal to the first voltage within the reference circuit branch. Assuming that the voltage regulator 431 has a negligible offset, which may be achieved by well-known and established methods for offset cancellation, the second voltage at the drain of the second transistor 611 is regulated to the first voltage vb2 at the drain of the first transistor 621.

At the same time, the third transistor 620 and the fourth transistor 610 are configured to attain a pre-determined resistance ratio which enforces a pre-determined current ratio between the reference current within the reference current circuit branch and a load current within the load current circuit branch. For this purpose, the gates of the third and the fourth transistors 620, 610 are directly connected with each other and with node 622 between the current source 650 and the optional voltage regulator 440. Moreover, the sources of the third and the fourth transistor 620, 610 are connected to ground and the drains of the third transistor 620 and the fourth transistor 610 are connected to the sources of the first transistor 621 and the fourth transistor 610, respectively. In such a configuration, transistor 620 and transistor 610 correspond to variable resistors. For example, if the latter transistors are of the same type (such as e.g. NMOS transistors) and have the same properties (specifications, parameters of operation), they may achieve the same resistance value. In an ideal scenario, this configuration would result in the load current in the load current circuit branch having the same value as the reference current in the reference current circuit branch.

The accuracy of the current ratio between both currents ultimately depends on the accuracy of the resistance ratio of the two variable resistance elements 620, 610. However, for certain application scenarios said resistance ratio may not be sufficiently accurate and must be calibrated in a time-consuming offline procedure. In the circuit depicted in FIG. 2, the second transistor 611 is used for trimming or switching the load current flowing through the second variable resistance element 610 by switching on and off the load current provided to LED string 101. As already mentioned, lighting system 600 may comprises a plurality of load current circuit branches for powering a plurality of LED strings 101. Additionally, variable resistance element 610 may be used for applying PWM control to the respective LED string 101. By performing PWM control, the load current may be periodically interrupted, which results in a user's perception of a warmer color of the light emitted by LED string 101. The first transistor 621 in the reference current circuit branch serves as a counterpart to the second transistor 611 within the load current circuit branch. Both transistors may be operated in the triode region, may be of the same type, and may have the same properties (in particular the same resistance/impedance). Accordingly, in the prior art system described FIG. 2, the first transistor 621 is not switched even when PWM control is applied to the second transistor 611.

Figure 3:
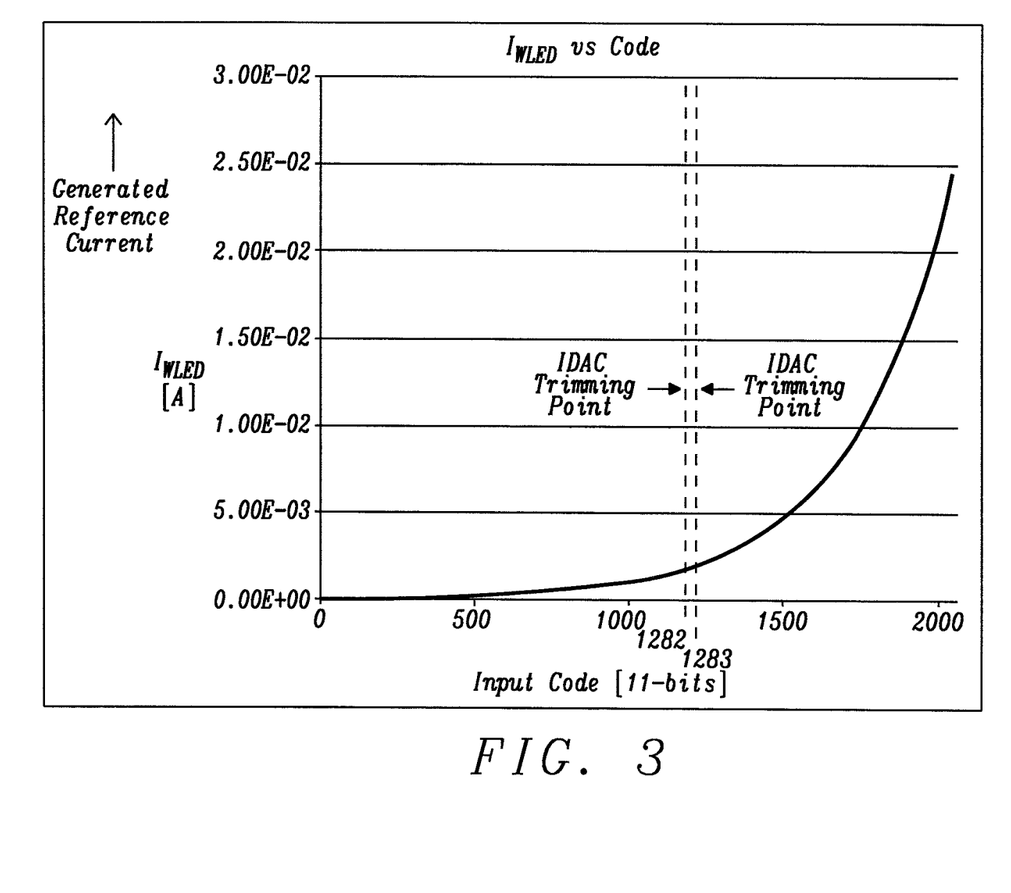
FIG. 3 shows a diagram illustrating the relationship between input code and generated current of a programmable IDAC.

FIG. 3 shows a diagram illustrating the relationship between input code and generated reference current $I_{WLED}$ of the IDAC 651. The IDAC 651 may have a matrix providing the reference current, which is mirrored e.g. by a factor 2 or 20 using respective load current circuit branches to the plurality of LED strings 101. The matrix current is variable and is controlled by an 11-bit digital input code (0-2047). The input code to current characteristic is determined by a lookup table which maps the 11 bit digital input code to generate an exponential current profile. The matrix contains 16384 unit elements which are addressed by the 14 bit output of the linear to exponential lookup table.

Due to this mapping, at one particular input code (code 1282) almost all of the elements of the matrix are enabled providing the maximum reference current it can provide, which is then mirrored by a factor 2. At the next code (1283), the matrix rolls back to approximately one tenth of the maximum current it can provide and this current is then mirrored by a factor 20. This is the code pair where a huge portion of active circuitry is turned off and a different set of elements is enabled to provide the necessary reference current. Hence, due to the resulting mismatch, there could be a negative differential nonlinearity DNL spike at this transition (i.e. from input code 1282 to input code 1283) which is not desirable. This is referred to as a rollover point.

Figure 4:
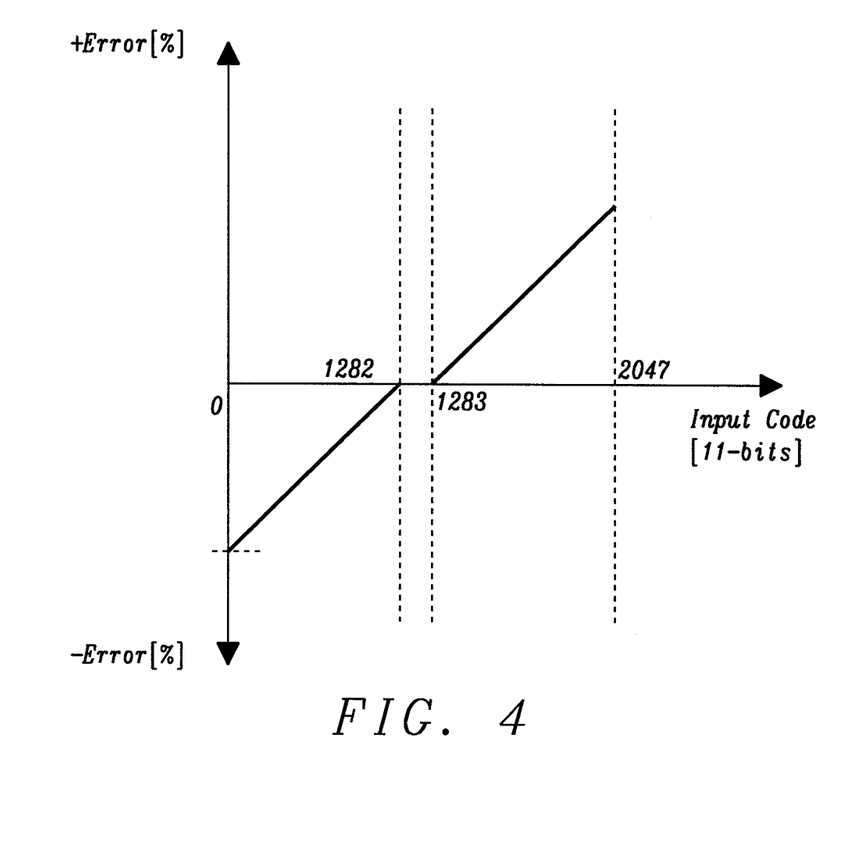
FIG. 4 shows the trimming error achieved by a conventional trimming method.

On silicon, the IDAC current is trimmed at this particular input code pair (i.e. input code 1282 to input code 1283), where the maximum DNL error can occur. FIG. 4 shows the input code to current characteristic of the IDAC 651 and the input code pair where the IDAC 651 is trimmed for DNL.

The absolute accuracy of the IDAC current is given by the following equation $$(I_{WLED}(\text{trimmed})/I_{WLED}(\text{target})-1)*100,$$

wherein $I_{WLED}$ (target) is the target WLED string current or IDAC current which is expected for a given input code and IWLED (trimmed) is the IDAC current after trimming to meet the target value. One fundamental problem of the existing trimming approach is that, poor control on what happens at extreme ends of the input code range (0 and 2047) is achieved. At the extreme ends of the input code range, one could potentially end up with a reduced accuracy (see FIG. 4).

Figure 5:
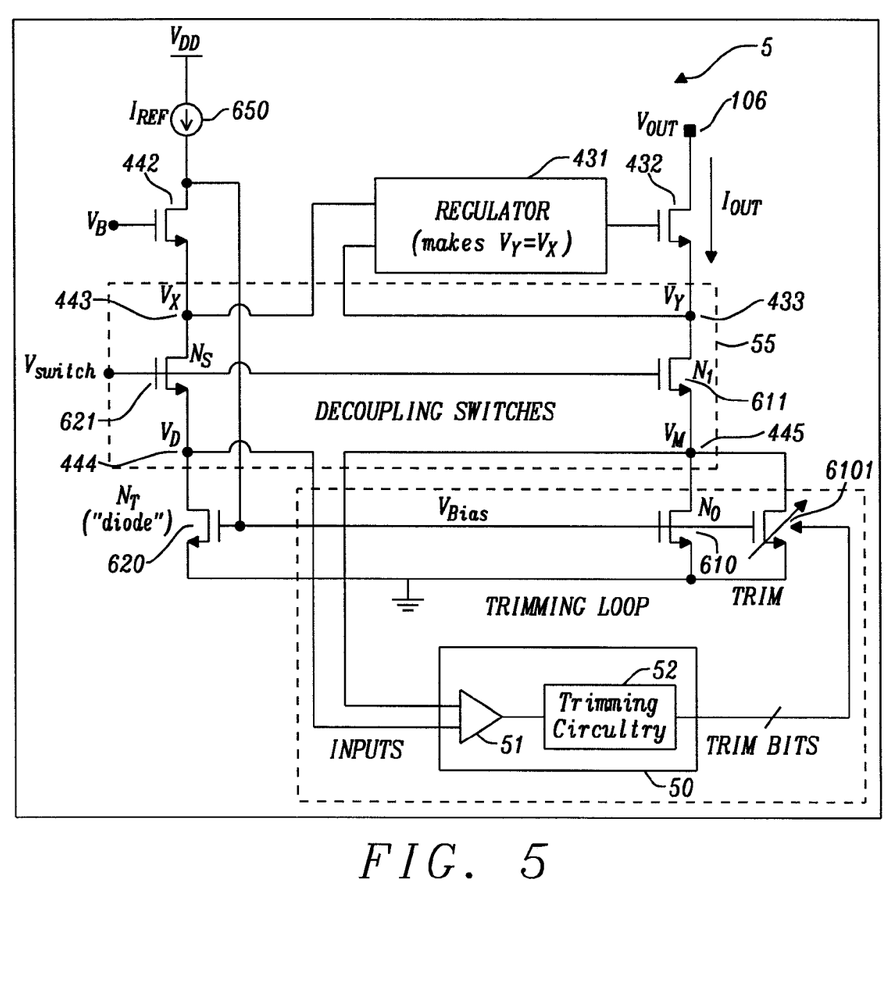
FIG. 5 shows a trimming system for automatically trimming a load current.

FIG. 5 displays an exemplary trimming system 5 for automatically trimming the load current provided to the load terminal 106. The depicted trimming systems 5 builds upon lighting system 600 depicted in FIG. 2. As always, the same reference numerals denote the same or similar circuit components. Trimming system 5 differs from lighting system 600 in that the first transistor 621 is used as a first decoupling resistance element and the second transistor 611 is used as a second decoupling resistance element. The same switching voltage $V_{switch}$ is applied to the gates of the first transistor 621 and the second transistor 611. Together, the latter transistors 621 and 611 form a decoupling stage 55. The regulator 431 is illustrated in an abstracted view and is configured to regulate a voltage at the drain of the second transistor 611 towards a voltage at the drain of the first transistor 621. It is assumed that the decoupling transistors 621 and 611 are of the same type and exhibit identical properties, in particular the same resistance/impedance between their drains and sources. A mismatch between the latter transistors is assumed to be negligible as the voltage drop across them is very small compared to the output voltage.

For example, and without loss of generality, it is assumed that the resistance ratio is supposed to be 1 and, thus, the load current is supposed to equal the reference current. Thus, the drain voltages of the third transistor 620 and the fourth transistor 610 should be identical. If now the fourth transistor 610 has a lower resistance value than expected (caused e.g. by non-ideal manufacturing) or the third transistor 620 has a higher resistance value than expected, the current through the fourth transistor 610 will increase and may exceed the current through the third transistor 620. Put in a different way, if the fourth transistor 610 is stronger than the third transistor 620, transistor 610 will pull more current. As a consequence, the voltage at node 445 at the source of the second transistor 611 will decrease, such that the gate-to-source voltage $V_{GS}$ of the second transistor 611 is sufficient to support the increased load current. In fact, since the gate voltage of the second transistor 611 is given by $V_{switch}$, the source voltage of the second transistor 611 is the only node voltage which is free to move. Thus, it can be said that the second transistor's 611 $V_{GS}$ has to increase in order to support the increased current between drain and source of the second transistor 611. As the voltage at node 445 at the source of the second transistor 611 decreases, the load current decreases again. Nevertheless, the load current will still be larger than the reference current. In the end, the drain-source-voltage of the fourth transistor 610 is smaller than the drain-source-voltage of the third transistor 620, which may be exploited when designing the trimming circuitry 52. In particular, the voltage difference between node 444 and node 445 may be used as basis for trimming the load current. The same reasoning applies vice versa in case the fourth transistor 610 is weaker than the third transistor 620, i.e. the fourth transistor 610 has a higher resistance value than expected or the third transistor 620 has a lower resistance value than expected.

As a result, the voltage difference between nodes 444 and 445 may be used to trim the load current to a desired value. In the described exemplary scenario, a voltage difference equal to zero is a necessary and sufficient condition for the reference current and the load current to be equal.

Moreover, trimming system 5 comprises a current regulator 50 for regulating the load current based on a voltage difference between nodes 444 and 445 at the drains of decoupling transistors 621 and 611, respectively. It is the duty of the current regulator to reduce said voltage difference by enabling or disabling the current branches comprising additional transistors (variable resistance elements) 6101 within the load current circuit branch to compensate a mismatch in the resistance ratio of transistors 620 and 610.

The current branch comprising transistor 6101 may be enabled by closing a respective switching unit (not shown) or disabled by opening the respective switching unit. In FIG. 5, only one additional current branch with additional transistor 6101 is depicted. However, those skilled in the art will readily understand that a plurality of additional transistors 6101 may be arranged in parallel to the fourth transistor 610 in order to increase/decrease the overall resistance in the load current circuit branch. For each transistor 6101, a respective switching unit may be provided in order to enable/disable the respective current branch.

The exemplary current regulator 50 in FIG. 5 comprises a comparator unit 51 (also denoted error amplifier) for detecting and measuring the voltage difference and for generating a comparator signal. The inputs of the comparator unit 51 are connected to nodes 444 and 445, respectively. Current regulator 50 further comprises a trimming circuitry 52 which receives e.g. the comparator signal and generates a plurality of trim bits for controlling the additional transistors 6101. To be more specific, the trim bits may be supplied to the input of the switching units for enabling/disabling the respective current branches.

The current regulator 50 may be configured to disable an additional resistor 6101 in parallel to the second variable resistance element 610 in case the voltage difference indicates that the voltage at node 444 is larger than the voltage at node 445. The other way round, the current regulator 50 may be configured to enable the additional resistor 6101 in parallel to the second variable resistance element 610 in case the voltage at node 444 is smaller than the voltage at node 445.

Figure 6:
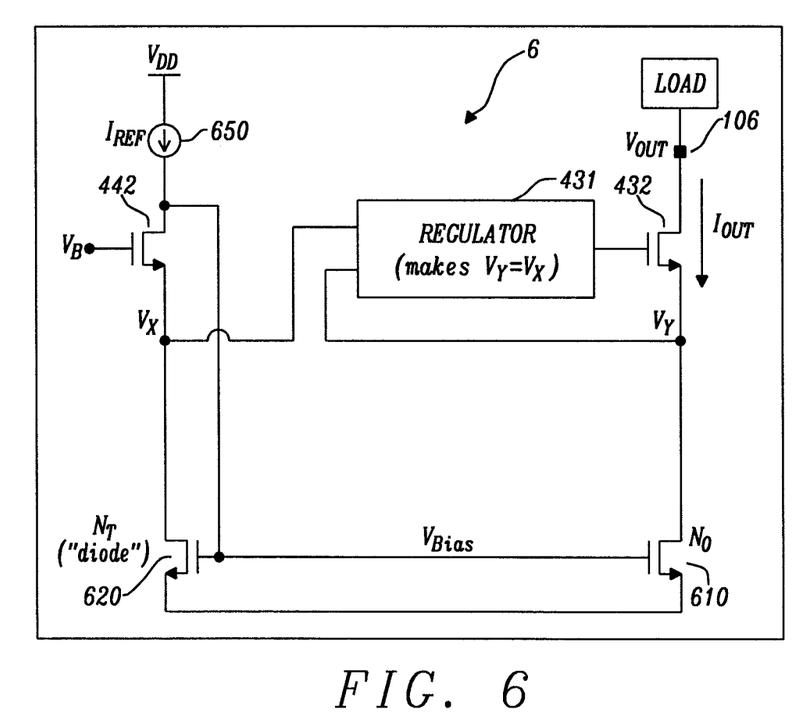
FIG. 6 shows a lighting system without decoupling resistance elements.

FIG. 6 shows a lighting system 6 without decoupling stage 55. Assuming again a desired resistance ratio (also denoted as mirror ratio) of 1, even though the voltages at the drains of transistor 610 and transistor 620 are kept equal by the voltage regulator 431, this doesn't mean that the reference current necessarily equals the load current. In other words, equalizing the drain voltages of both transistors 610, 620 is not enough to achieve equal currents. Moreover, in the lighting system 6 depicted in FIG. 6, the difference between the drain voltages does not represent a meaningful input signal for a current regulator 50 which attempts to trim the load current.

Figure 7:
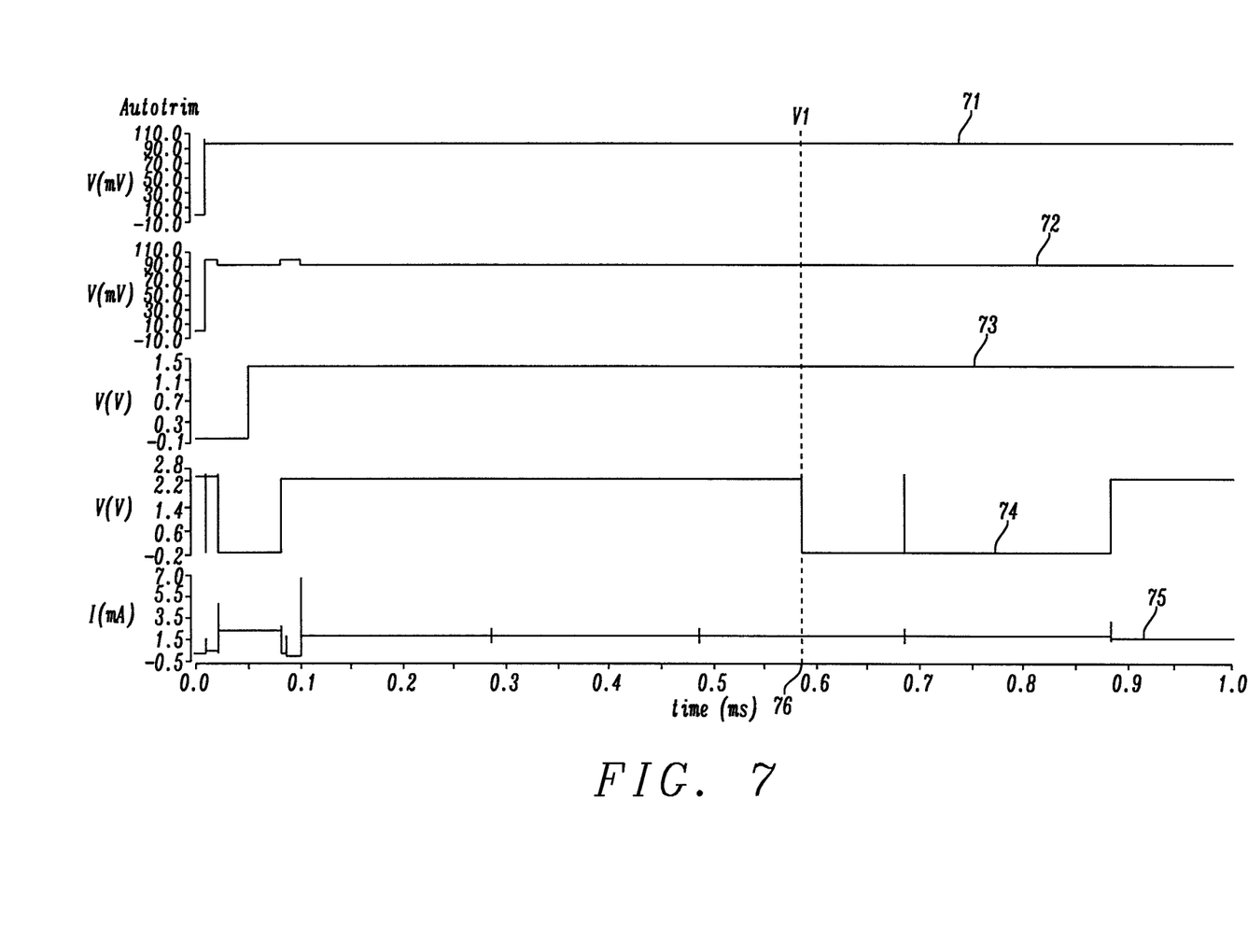
FIG. 7 shows simulation results.

FIG. 7 shows simulation results. As an example, we take 1 mA as reference current and a mirror ratio between the transistors 610, 620 being 1:2. FIG. 7 shows the drain voltage 71 at node 444, the drain voltage 72 at node 445, a trimming-enable signal 73 which starts the trimming procedure, the comparator signal 74 and the load current 75 in the load current circuit branch over time. The system was verified by intentionally introducing a mismatch in the mirror ratio and it can be seen from the plots that, when the trimming circuitry is enabled by the trimming-enable signal 73, the two drains voltages 71, 72 are at different voltage levels due to the introduced mismatch. This triggers the comparator unit 51 inside the on-chip current regulator 50 to trip and the trimming circuitry 52 starts the trimming process. In the simulated example scenario, the current regulator comprises five additional, parallel current branches with respective transistors, whose resistances are binary weighted. Meanwhile, it can be seen that the load current 75 moves up and down and the drain voltages 71, 72 settle to the same level at one instance of time 76 when the current reaches the expected 2 mA. It should also be noted that at this very same instance 76 of time, the comparator signal 74 of the comparator unit 51 falls to zero and this state should be latched to retain a valid trim configuration. The overall settling can take a few milliseconds to seconds depending on how fast or slow the system is designed. In general, the trimming loop could be slow, but as long as it is faster than the human eye response, the settling behavior or the automatic calibration will not be detectable by the end user.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A trimming system for trimming a load current provided to a load terminal, the trimming system comprising:
    a reference current circuit branch with
        a current source configured to generate a reference current;
        a first variable resistance element; and
        a first decoupling resistance element connected between the current source and the first variable resistance element;
    a load current circuit branch with
        the load terminal;
        a second variable resistance element configured to attain a resistance value depending on a resistance value attained by the first variable resistance element; and
        a second decoupling resistance element connected between the load terminal and the second variable resistance element;
    a voltage regulator configured to regulate a second voltage at a node between the load terminal and the second decoupling resistance element depending on a first voltage at a node between the current source and the first decoupling resistance element,
    a current regulator configured to regulate the load current provided to the load terminal based on a voltage difference between a first output terminal of the first decoupling resistance element and a second output terminal of the second decoupling resistance element.

2. The trimming system according to claim 1, wherein the first variable resistance element is a diode-connected MOS transistor operating either in saturation or in the triode region and the second variable resistance element is a proportional mirror transistor operating in the same region as the diode-connected MOS transistor.

3. The trimming system according to claim 1, wherein the current regulator is configured to reduce said voltage difference.

4. The trimming system according to claim 1, wherein the current regulator is configured to regulate, based on said voltage difference, the load current by enabling or disabling a current branch within the load current circuit branch, said current branch being arranged in parallel to the second variable resistance element and comprising a third variable resistance element.

5. The trimming system according to claim 1, wherein the current regulator is configured to disable an additional current branch in parallel to the second variable resistance element in case the voltage difference indicates that a voltage at the first output terminal is larger than a voltage at the second output terminal.

6. The trimming system according to claim 1, wherein the current regulator is configured to enable an additional current branch in parallel to the second variable resistance element in case the voltage difference indicates that a voltage at the first output terminal is lower than a voltage at the second output terminal.

7. The trimming system according to claim 1, wherein the first output terminal is located on the reference current circuit branch between the first decoupling resistance element and the first variable resistance element.

8. The trimming system according to claim 1, wherein the second output terminal is located on the load current circuit branch between the second decoupling resistance element and the second variable resistance element.

9. The trimming system according to claim 1, wherein the first variable resistance element is configured to attain the resistance value in dependence on a current output by the current source.

10. The trimming system according to claim 1, wherein the first decoupling resistance element comprises a first transistor and the second decoupling resistance element comprises a second transistor, and wherein a gate of the first transistor and a gate of the second transistor are biased at the same voltage level.

11. The trimming system according to claim 10, wherein a source of the first transistor is connected with the first output terminal such that a voltage at the first output terminal is applied to the source of the first transistor.

12. The trimming system according to claim 10, wherein a source of the second transistor is connected with the second output terminal such that a voltage at the second output terminal is applied to the source of the second transistor.

13. The trimming system according to claim 1, wherein the second variable resistance element is configured such that a resistance ratio between the resistance value of the first variable resistance element and the resistance value of the second variable resistance element corresponds to a ratio among a set of predetermined ratios.

14. The trimming system according to claim 1, wherein the first variable resistance element comprises a third transistor and the second variable resistance element comprises a fourth transistor, and both the third transistor and the fourth transistor are biased to operate in the triode region.

15. The trimming system according to claim 14, wherein a gate terminal of the third transistor is connected to a gate terminal of the fourth transistor.

16. The trimming system according to claim 14, wherein the gate terminal of the third transistor is connected to a node between the current source and a drain terminal of the first decoupling resistance element.

17. The trimming system according to claim 14, wherein both a source of the third transistor and a source of the fourth transistor are connected to the same reference potential (e.g. ground).

18. The trimming system according to claim 14, wherein a drain of the third transistor is connected to the first output terminal and a drain of the fourth transistor is connected to the second output terminal.

19. The trimming system according to claim 14, wherein the current regulator comprises a trimming circuitry and a parallel path between the second output terminal and ground, the parallel path comprising a fifth transistor, wherein a gate terminal of the fifth transistor is connected to the gate terminals of the third and the fourth transistor;

a switching unit configured to interrupt, based on a control signal received from the trimming circuitry, the parallel path, wherein the trimming circuitry is configured to reduce the voltage difference by generating the control signal.

20. The trimming system according to claim 1, further comprising a light emitting diode LED circuit connected to the load terminal.

21. The trimming system according to claim 1, further comprising a power source configured to provide a drive voltage to an external load.

22. The trimming system according to claim 1, wherein the voltage regulator is configured to regulate the second voltage to a voltage level which is substantially equal to a voltage level of the first voltage.

23. A method of trimming a load current provided to a load terminal, the method comprising the steps of:

providing a reference current circuit branch with a current source for generating a reference current, a first variable resistance element, and a first decoupling resistance element connected between the current source and the first variable resistance element;

providing a load current circuit branch with the load terminal, a second variable resistance element, and a second decoupling resistance element connected between the load terminal and the second variable resistance element;

attaining, by the second variable resistance element, a resistance value depending on a resistance value attained by the first variable resistance element;

regulating a second voltage at a node between the load terminal and the second decoupling resistance element depending on a first voltage at a node between the current source and the first decoupling resistance element; and regulating the load current provided to the load terminal based on a voltage difference between a first output terminal of the first decoupling resistance element and a second output terminal of the second decoupling resistance element.

24. The method according to claim 23, wherein the step of regulating the load current comprises reducing said voltage difference.

25. The method according to claim 23, wherein the step of regulating the load current comprises enabling or disabling current branches within the load current circuit branch, said current branches arranged in parallel to the second variable resistance element.

26. The method according to claim 23, wherein the step of regulating the load current comprises disabling an additional current branch in parallel to the second variable resistance element in case the voltage difference indicates that a voltage at the first output terminal is larger than a voltage at the second output terminal.

27. The method according to claim 23, wherein the step of regulating the load current comprises enabling an additional current branch in parallel to the second variable resistance element in case the voltage difference indicates that a voltage at the first output terminal is lower than a voltage at the second output terminal.

* * * * *